US009753205B2

(12) United States Patent
Takagi et al.

(10) Patent No.: US 9,753,205 B2
(45) Date of Patent: Sep. 5, 2017

(54) LIGHT GUIDE BODY AND LIGHT-EMITTING DEVICE

(71) Applicant: OMRON Corporation, Kyoto-shi, Kyoto (JP)

(72) Inventors: Yoshihiko Takagi, Kyoto (JP);
Masayuki Shinohara, Kyoto (JP);
Yoshimasa Osumi, Kyoto (JP);
Norikazu Kitamura, Osaka (JP);
Junya Fujita, Aichi (JP)

(73) Assignee: OMRON Corporation, Kyoto (JP)

( * ) Notice: Subject to any disclaimer, the term of this patent is extended or adjusted under 35 U.S.C. 154(b) by 187 days.

(21) Appl. No.: 14/470,749

(22) Filed: Aug. 27, 2014

(65) Prior Publication Data

US 2015/0092441 A1    Apr. 2, 2015

(30) Foreign Application Priority Data

Sep. 27, 2013   (JP) .................................. 2013-202753

(51) Int. Cl.
*F21V 7/04*     (2006.01)
*F21V 8/00*     (2006.01)
*G02B 27/22*    (2006.01)

(52) U.S. Cl.
CPC ........... *G02B 6/0036* (2013.01); *G02B 6/006* (2013.01); *G02B 6/0038* (2013.01); *G02B 27/22* (2013.01)

(58) Field of Classification Search
CPC .... G02B 6/0036; G02B 6/0038; G02B 6/006; G02B 27/22
USPC .......................................................... 362/625
See application file for complete search history.

(56) References Cited

U.S. PATENT DOCUMENTS

2012/0075698 A1\*   3/2012  Minami ............... G02B 6/0043
                                                        359/462

FOREIGN PATENT DOCUMENTS

JP          H11-85075 A       3/1999

\* cited by examiner

*Primary Examiner* — Andrew Coughlin
*Assistant Examiner* — Meghan Ulanday
(74) *Attorney, Agent, or Firm* — Osha Liang LLP (57) ABSTRACT

An exit surface of a light guide plate includes a first position from which first emitted light is emitted within an angular range that causes the first emitted light to be applied to one eye and the vicinity thereof and a second position from which second emitted light is emitted within an angular range that causes the second emitted light to be applied to the other eye and the vicinity thereof. A straight line that passes through the first position and the center of the one eye and a straight line that passes through the second position and the center of the other eye intersect with each other.

8 Claims, 11 Drawing Sheets

LIGHT GUIDE BODY AND LIGHT-EMITTING DEVICE

CROSS-REFERENCE TO RELATED APPLICATIONS

This Nonprovisional application claims priority under 35 U.S.C. §119 on Patent Application No. 2013-202753 filed in Japan on Sep. 27, 2013, the entire contents of which are hereby incorporated by reference.

BACKGROUND

Technical Field

The present invention relates to a light guide body in which light emitted from a light source and having entered the light guide body is guided and emitted through a light exit surface, and a light-emitting device including the light guide body.

Related Art

Conventionally, there is known a technique in which light emitted from a light source, which is disposed at a side surface of a light guide plate, into the light guide plate is reflected by a reflection pattern on a back surface side of the light guide plate so as to be emitted from a front surface of the light guide plate.

For example, Patent Literature 1 discloses a technique in which a reflection pattern is provided in a region, having a shape corresponding to a predetermined letter, of a back surface of a light guide plate, so that a region that is on a front surface side of the light guide plate and corresponds to the letter emits light.

[Patent Literature 1]
Japanese Patent Application Publication, Tokukaihei, No. 11-85075 A (Publication Date: Mar. 30, 1999)

SUMMARY

However, although the technique disclosed in Patent Literature 1 makes it possible to display the letter corresponding to the shape of the reflection pattern, the technique merely allows carrying out planar display because the emitted light is substantially uniform throughout the area of the letter. Thus, sufficient visual effect cannot be obtained.

A light guide body according to one or more embodiments of the present invention allows an object such as a diagram or a picture to be displayed stereoscopically.

A light guide body in accordance with one or more embodiments of the present invention is a light guide body including: reflection patterns each of which causes light emitted from at least one light source and having entered the light guide body through a side surface of the light guide body to be reflected; and an exit surface through which light reflected from each of the reflection patterns is emitted, the exit surface including (i) a first position from which first emitted light is emitted within an angular range that causes the first emitted light to be applied to one eye and a vicinity thereof of an observer observing the exit surface and (ii) a second position from which second emitted light is emitted within an angular range that causes the second emitted light to be applied to the other eye and a vicinity thereof of the observer, a straight line which passes through the first position and a center of the one eye of the observer and a straight line which passes through the second position and a center of the other eye the observer intersecting with each other.

One or more embodiments of the present invention may make it possible to provide a light guide body which allows an object such as a diagram or a picture to be displayed stereoscopically.

DETAILED DESCRIPTION

Embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The following description will discuss, with reference to FIGS. 1(a) through 10(b), embodiments of the present invention. As an example, a light-emitting device 10 which includes a light guide plate (light guide body) 2 in accordance with one or more embodiments of the present invention will be described.

<Arrangement of Light-Emitting Device 10>

An arrangement of the light-emitting device 10 in accordance with the present embodiment will be described below with reference to FIGS. 1(*a*)-1(*b*). The light-emitting device 10 stereoscopically displays, on an exit surface 22 of the light guide plate 2, an object such as a diagram or a picture.

Figures 1A, 1B:
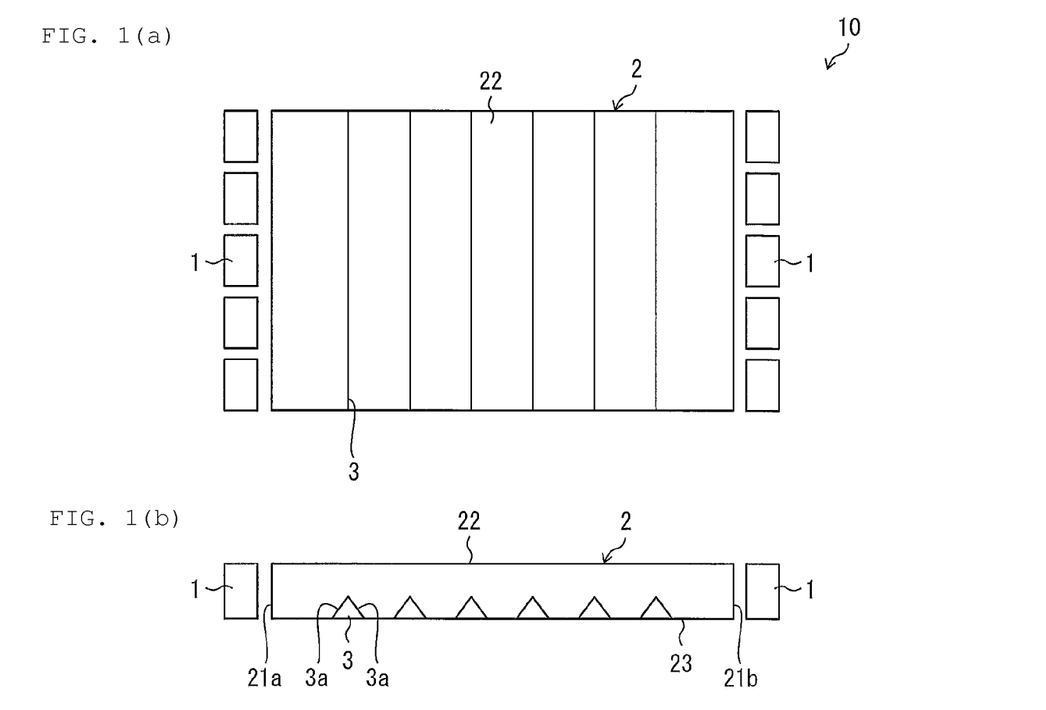
FIG. 1(a) is a top view illustrating an arrangement of a light-emitting device in accordance with one or more embodiments of the present invention.
FIG. 1(b) is a cross-sectional view illustrating the light-emitting device illustrated in FIG. 1(a).

FIG. 1(*a*) is a top view illustrating an arrangement of the light-emitting device 10 in accordance with the one or more embodiments of the present invention, and FIG. 1(*b*) is a cross-sectional view of the light-emitting device 10 illustrated in FIG. 1(*a*). As illustrated in FIGS. 1(*a*)-1(*b*), the light-emitting device 10 includes a light source 1 and the light guide plate 2.

(Light Source 1)

The light source 1 is a light-emitting element which emits light to the light guide plate 2. According to one or more embodiments of the present invention, the light source 1 is a point light source, a suitable example of which is an LED (Light Emitting Diode). Note that other light sources such as a fluorescent light can be employed as the light source 1, apart from the LED.

In one or more embodiments of the present invention, a plurality of said light sources 1 are arranged along each of two opposite side surfaces 21*a* and 21*b* of the light guide plate 2. Note, however, that it is possible to employ an arrangement in which the number of the light source(s) 1 provided so as to face each of the side surfaces 21*a* and 21*b* is one (1). It is also possible to employ an arrangement in which the light source(s) 1 is provided for only one of the side surfaces 21*a* and 21*b*.

(Light Guide Plate 2)

The light guide plate 2 is a light guide member in which light emitted from the light sources 1 and having entered the light guide plate 2 through the respective side surfaces 21*a* and 21*b* is guided so as to be emitted from the exit surface 22. The light guide plate 2 is a transparent plate member which is made of a material (e.g., acrylic resin or the like) that totally reflects light. Note that the light guide plate 2 is not limited to a shape constituted by flat surfaces, but can be a shape that includes a spherical surface or a free-form surface. Further, although one or more embodiments of the present invention employs the light guide plate 2 as the light guide body, the light guide body may have a shape other than a plate shape, for example, a cylindrical shape or the like.

The light guide plate 2 includes, on a bottom surface (counter surface) 23 opposite to the exit surface 22, reflection patterns 3 which cause specular reflection of light that has entered the light guide plate 2 through each of the side surfaces 21*a* and 21*b*. The reflection patterns 3 are each a V-groove structure extending substantially perpendicular to an incident direction of the light, and are arranged in a plurality of rows along the incident direction. Note that, for easy explanation, FIGS. 1(*a*)-1(*b*) shows fewer reflection patterns 3 of the light guide plate 2 than those actually provided.

Each reflection pattern 3 has an inclined surface (reflecting surface) 3*a* which reflects, toward the exit surface 22, light that has been emitted from the light source 1 and entered the light guide plate 2 through each of the side surfaces 21*a* and 21*b*. In one or more embodiments of the present invention, in order to cause light emitted from the light source 1 and having entered the light guide plate 2 through the respective two side surfaces 21*a* and 21*b* to be reflected, each reflection pattern 3 has two inclined surfaces 3*a* which correspond to the respective side surfaces 21*a* and 21*b*.

In order for the displayed object to be stereoscopically perceived by an observer, an angle and the like of each inclined surface 3*a* of the reflection pattern 3 is adjusted so that light having a predetermined directivity is emitted from a predetermined position on the exit surface 22. Note that the reflection patterns 3 and the directivity of the light emitted from the exit surface 22 will be described later.

<Details of Reflection Pattern 3>

Figure 2:
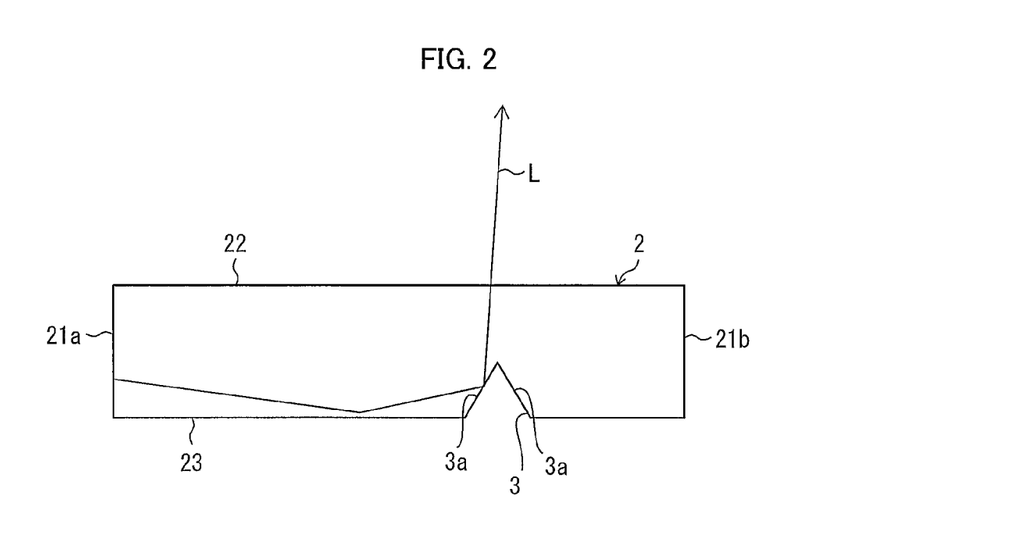
FIG. 2 is a cross-sectional view illustrating a mechanism of reflection by reflection patterns.
Figure 3A:
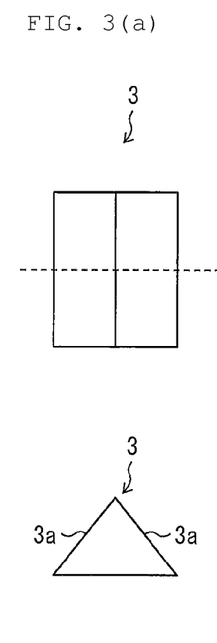
FIGS. 3(a)-(d) are cross-sectional views illustrating an example shape of a reflection pattern.
Figure 3B:
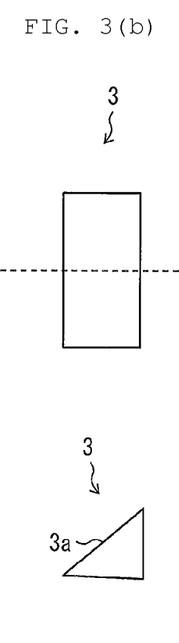
Figure 3C:
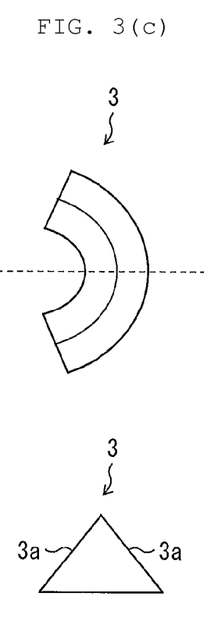
Figure 3D:
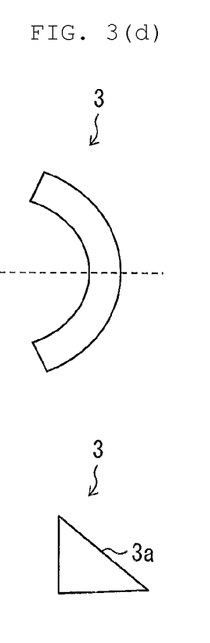

Next, the following description will discuss details of the reflection patterns 3 with reference to FIGS. 2 and 3(*a*)-3(*d*).

FIG. 2 is a cross-sectional view illustrating the mechanism of reflection by the reflection patterns 3. FIG. 2 illustrates a case in which light having entered the light guide plate 2 through the side surface 21*a* is reflected by a reflection pattern 3.

As illustrated in FIG. 2, the reflection pattern 3 causes the light having entered the light guide plate 2 through the side surface 21*a* to be reflected toward the exit surface 22 by specular reflection by means of an inclined surface 3*a*. The light reflected by the specular reflection by means of the inclined surface 3*a* is emitted from the exit surface 22 as emitted light L having a high directivity.

Each of FIGS. 3(*a*)-3(*d*) is a cross-sectional view illustrating an example shape of a reflection pattern 3. An upper stage of each of FIGS. 3(*a*)-3(*d*) shows a top view of the reflection pattern 3, and a lower stage of each of FIGS. 3(*a*)-3(*d*) shows a cross-sectional view of the reflection pattern 3.

As illustrated in FIG. 3(*a*), in one or more embodiments of the present invention, each reflection pattern 3 has a shape including two inclined surfaces 3*a* in order to cause light emitted from the light source 1 and having entered the light guide plate 2 through the respective two the side surfaces 21*a* and 21*b* to be reflected. Note, however, that a cross-sectional shape and a pattern shape of the reflection pattern 3 can be modified as appropriate in accordance with a positional arrangement of the light source 1, a type of the object to be displayed, an observation position (a distance and an angle between the observer and the exit surface 22), and the like.

For example, in a case where the light source 1 is provided only on one side surface 21*a* of the light guide plate 2, the reflection pattern 3 may have a cross-sectional shape having an inclined surface 3*a* only on a side surface 21*a* side, as illustrated in FIG. 3(*b*).

Further, as illustrated in FIG. 3(*c*), the reflection pattern 3 is not limited to a linear pattern shape, but may have a curvilinear pattern shape. This makes it possible to display various objects.

As illustrated in FIG. 3(*d*), in a case where the light source 1 is provided only on one side surface 21*b* of the light guide plate 2, the reflection pattern 3 may have a cross-sectional shape having an inclined surface 3*a* only on a side surface 21*b* side, as illustrated in FIG. 3(*d*).

According to one or more embodiments of the present invention, an interval between adjacent reflection patterns 3 is such a length that human eyes cannot recognize that the reflection patterns 3 are provided and, for example, approximately 300 μm. In a case where the interval between the reflection patterns 3 is too wide, the displayed object appears fragmentary, thereby making it difficult for the observer to have a stereoscopic view of the object.

Note that, although the reflection patterns 3 in one or more embodiments of the present invention are provided in the form of concave portions (grooves) formed by cutting the bottom surface 23 of the light guide plate 2, the reflection patterns 3 are not limited to this arrangement. For example, the reflection patterns 3 may be provided as convex portions protruding from the bottom surface 23 of the light guide plate 2. Alternatively, the reflection patterns 3 may be provided as other reflecting members.

<Directivity of Light Emitted from Exit Surface 22>

Figure 4:
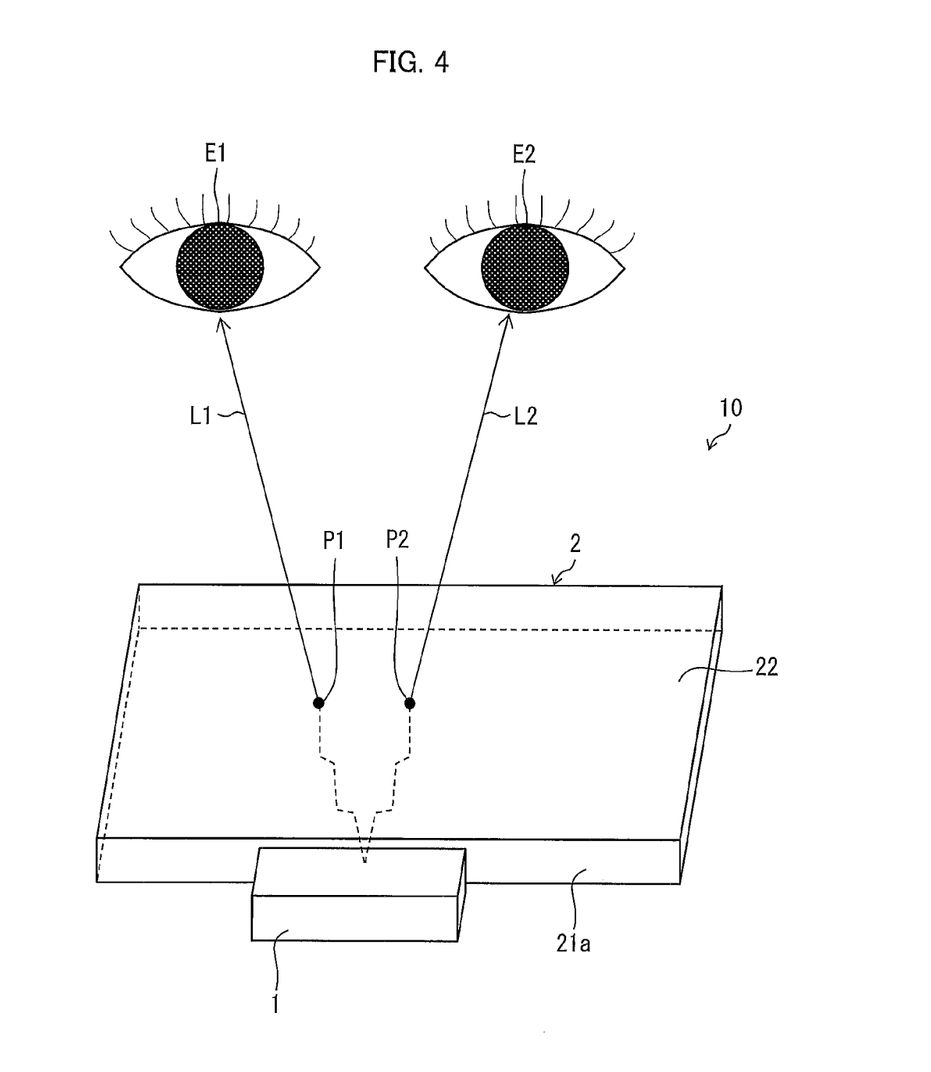
FIG. 4 is a perspective view illustrating a directivity of light emitted from an exit surface.
Figure 5:
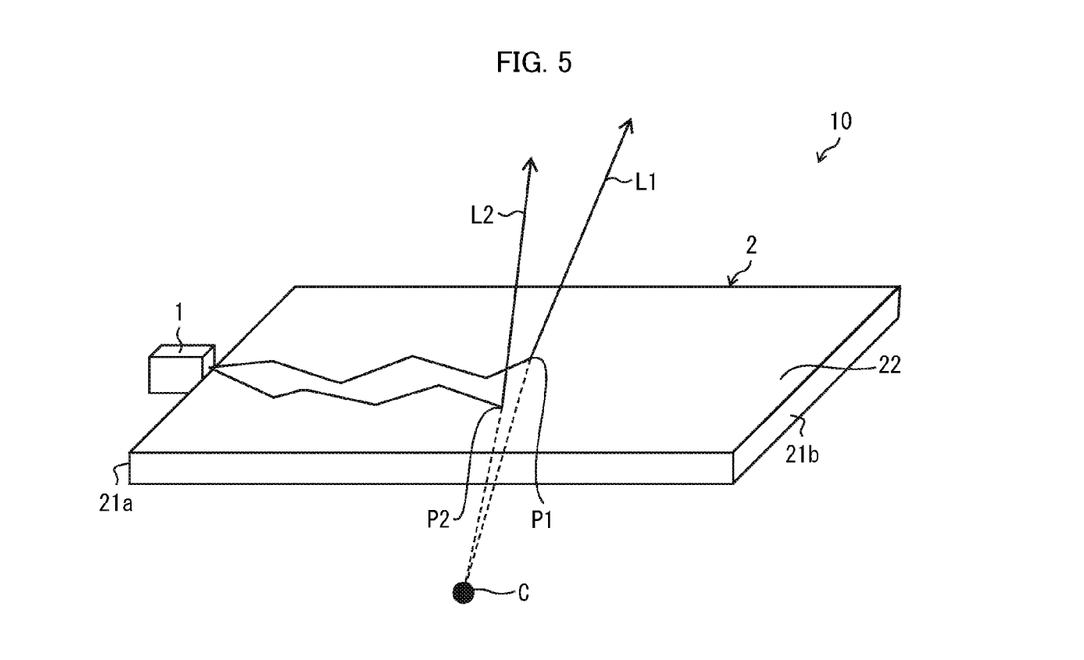
FIG. 5 is a perspective view illustrating an intersection between (i) a straight line that passes through a first position and the center of one eye of an observer and (ii) a straight line that passes through a second position and the center of the other eye of the observer.
Figure 6:
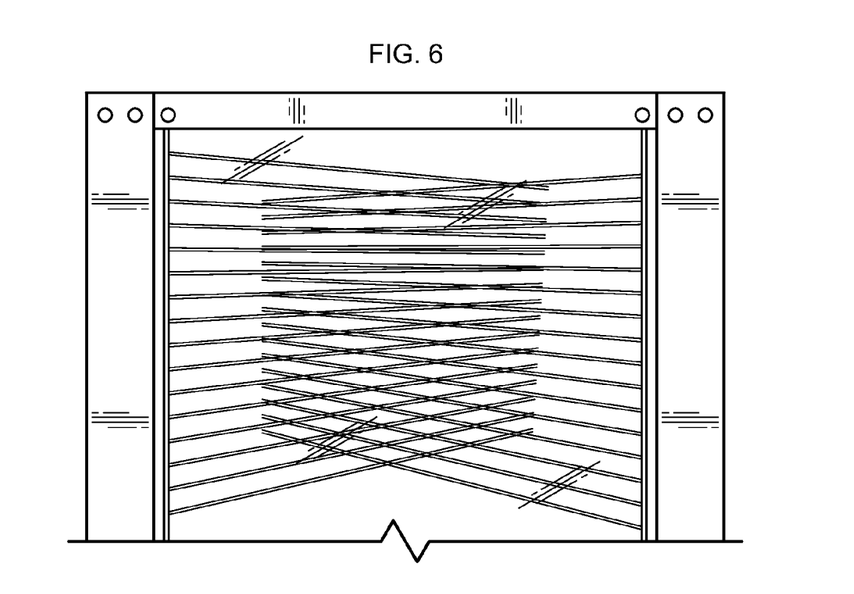
FIG. 6 is a photograph showing an example state in which the light-emitting device illustrated in FIGS. 1(a)-1(b) emits light.

Next, the following description will discuss, with reference to FIGS. 4 through 6, the directivity of light emitted from the exit surface 22.

FIG. 4 is a perspective view illustrating the directivity of each of first emitted light L1 and second emitted light L2 which are emitted from the exit surface 22. As illustrated in FIG. 4, the first emitted light L1 emitted from a first position P1 of the exit surface 22 is emitted within an angular range that causes the first emitted light L1 to be applied to one eye E1 and the vicinity thereof of the observer located at a predetermined observation position. On the other hand, the second emitted light L2 emitted from a second position P2 of the exit surface 22 is emitted within an angular range that causes the second emitted light L2 to be applied to the other eye E2 and the vicinity thereof of the observer.

That is, the first emitted light L1 emitted from the first position P1 is viewed by the one eye E1 of the observer, but not viewed by the other eye E2 of the observer. Or alternatively, the first emitted light L1 has a directivity that causes the light intensity perceived by the other eye E2 to be significantly lower than that perceived by the one eye E1. On the other hand, the second emitted light L2 emitted from the second position P2 is viewed by the other eye E2 of the observer, but not viewed by the one eye E1 of the observer. Or alternatively, the second emitted light L2 has a directivity that causes the light intensity perceived by the one eye E1 to be significantly lower than that perceived by the other eye E2.

Note that the angular range (directivity) of the first emitted light L1 emitted from the first position P1 and the angular range (directivity) of the second emitted light L2 emitted from the second position P2 are set as appropriate in accordance with the observation position (the distance and angle between the observer and the exit surface 22).

FIG. 5 is a perspective view illustrating an intersection C between (i) a straight line that passes through the first position P1 and the center of the one eye E1 of the observer and (ii) a straight line that passes through the second position P2 and the center of the other eye E2 of the observer. As illustrated in FIG. 5, the straight line passing through the first position P1 and the center (pupil, crystalline lens) of the one eye E1 and the straight line passing through the second position P2 and the center of the other eye E2 intersect with each other at the intersection C. In other words, the optical axis of light viewed by the one eye E1 of the observer among the first emitted light L1 emitted from the first position P1, and the optical axis of light viewed by the other eye E2 of the observer among the second emitted light L2 emitted from the second position P2 intersect with each other at the intersection C. This causes the observer to feel as if there were a light-emitting point at the intersection C.

In a case where the intersection C is located on an observer side with respect to the exit surface 22, the observer has a view in which the light-emitting point is popping out from the exit surface 22. On the other hand, in a case where the intersection C is located on a side opposite to the observer side with respect to the exit surface 22, the observer has a view in which the light-emitting point is located behind the exit surface 22. In one or more embodiments of the present invention, the intersection C is located below the bottom surface 23, that is, on the side opposite to the observer side with respect to the exit surface 22. This gives the observer an impression of depth.

In this way, in a case where (i) the first emitted light L1 is emitted within the angular range that causes the first emitted light L1 to travel toward the one eye E1 and the vicinity thereof of the observer, (ii) the second emitted light L2 is emitted within the angular range that causes the second emitted light L2 to travel toward the other eye E2 and the vicinity thereof of the observer, and (iii) there is the intersection C between the optical axis of the first emitted light L1 and the optical axis of the second emitted light L2, the observer feels as if there were a light-emitting point at the intersection C. Accordingly, it is possible to cause the observer to perceive a stereoscopic object by combining a plurality of such intersections C.

FIG. 6 is a photograph showing an example state in which the light-emitting device 10 emits light. As shown in FIG. 6, an object is stereoscopically displayed on the exit surface 22, which object is constituted by a plurality of lines of light which are arranged so as to extend between the side surfaces 21a and 21b (in a horizontal direction in FIG. 6) which are provided with light sources 1. The number of lines extending from each of the side surfaces 21a and 21b corresponds to the number of the light sources 1 which are provided for the each of the side surfaces 21a and 21b.

The impression of depth of the displayed object can be designed by changing an angle of reflection by the reflection patterns 3. For example, the smaller an angle formed at the intersection C by the straight line passing through the first position P1 and the center of the one eye E1 and the straight line passing through the second position P2 and the center of the other eye E2 is, the further the intersection C is located from the exit surface 22. As such, in order for a certain portion of the object to be displayed so as to give the observer a stronger impression of depth, the angle of reflection by a corresponding one of the reflection patterns 3 should be changed so that the angle formed at the intersection C is reduced.

Note that in a case where, as in one or more embodiments of the present invention, a plurality of light sources 1 are provided for each of the side surfaces 21a and 21b of the light guide plate 2, the directivity of light emitted from each of the plurality of light sources 1 is controlled so that light emitted from a single light source 1 passes through the first position P1 and the second position P2. This allows first emitted light L1 and second emitted light L2 both corresponding to a specific light source 1 to be emitted from the first position P1 and the second position P2. This makes it possible to suppress interference from light emitted from other light sources 1.

The directivity of light emitted from each light source 1 can be controlled, for example, by providing, between the each light source 1 and the light guide plate 2, a lens or the like that controls the beam diameter of light emitted from the each light source 1.

As described above, the light-emitting device 10 in accordance with one or more embodiments of the present invention includes (i) the reflection patterns 3 each of which reflects light emitted from the light source 1 and having entered the light-emitting device 10 through the side surface 21a or 21b and (ii) the light guide plate 2 which has the exit surface 22 through which light reflected from the reflection patterns 3 is emitted toward the observer, wherein the exit surface 22 includes (i) the first position P1 from which the first emitted light L1 is emitted within the angular range that causes the first emitted light L1 to be applied to the one eye E1 and the vicinity thereof of the observer and (ii) the second position P2 from which the second emitted light L2 is emitted within the angular range that causes the second emitted light L2 to be applied to the other eye E2 and the vicinity thereof of the observer, and wherein the straight line that passes through the first position P1 and the center of the one eye E1 of the observer and the straight line that passes through the second position P2 and the center of the other eye E2 of the observer intersect with each other.

The light-emitting device 10 has the above-described arrangement in which the straight line that passes through the first position P1 from which the first emitted light L1 is emitted and the center of the one eye E1 of the observer, and the straight line that passes through the second position P2 from which the second emitted light L2 is emitted and the center of the other eye E2 of the observer intersect with each other. In other words, the optical axis of light viewed by the one eye of the observer among the first emitted light emitted from the first position, and the optical axis of light viewed by the other eye of the observer among the second emitted light emitted from the second position intersect with each other. This causes the observer to feel as if there were a light-emitting point at the intersection C where the two straight lines intersect with each other.

As such, by adjusting the number of the reflection patterns 3, the angle of reflection by each of the reflection patterns 3, and the like, it is possible to cause the observer to perceive a stereoscopic object constituted by a combination of a plurality of such intersections C.

Therefore, one or more embodiments of the present invention makes it possible to provide the light-emitting device 10 which is capable of causing an object such as a diagram or a picture to be displayed stereoscopically by means of the light guide plate 2.

<Modified Example>

Next, the following description will discuss, with reference to FIGS. 7 through 10(b), modified examples of the light-emitting device 10.

Figure 7:
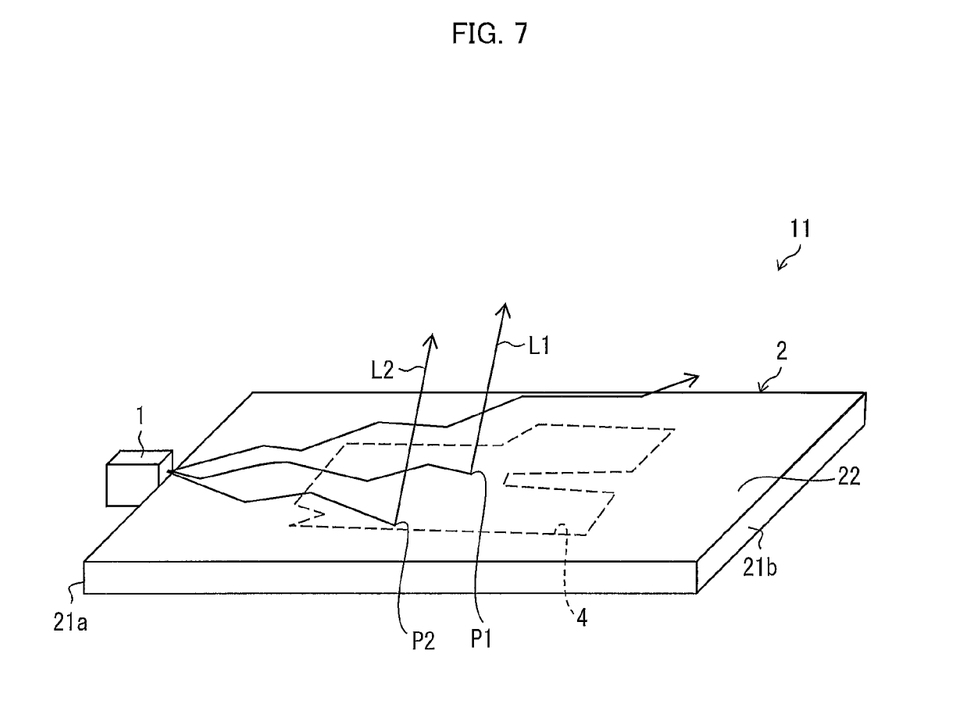
FIG. 7 is a perspective view illustrating a modified example of a light-emitting device.

FIG. 7 is a perspective view illustrating a modified example of the light-emitting device. As in a light-emitting device 11 illustrated in FIG. 7, the reflection patterns 3 may be provided in a light-emitting area 4, which is to be caused to emit light, of the light guide plate 2.

In this case, the light-emitting area 4 is provided to have a shape corresponding to that of the object to be displayed. In the light-emitting area 4, the reflection patterns 3 are provided in a plurality of rows with an interval of approximately 300 μm.

This makes it possible to cause an object of various kinds to be displayed stereoscopically by causing the light-emitting area 4, which corresponds to the object, to emit light.

Figure 8A:
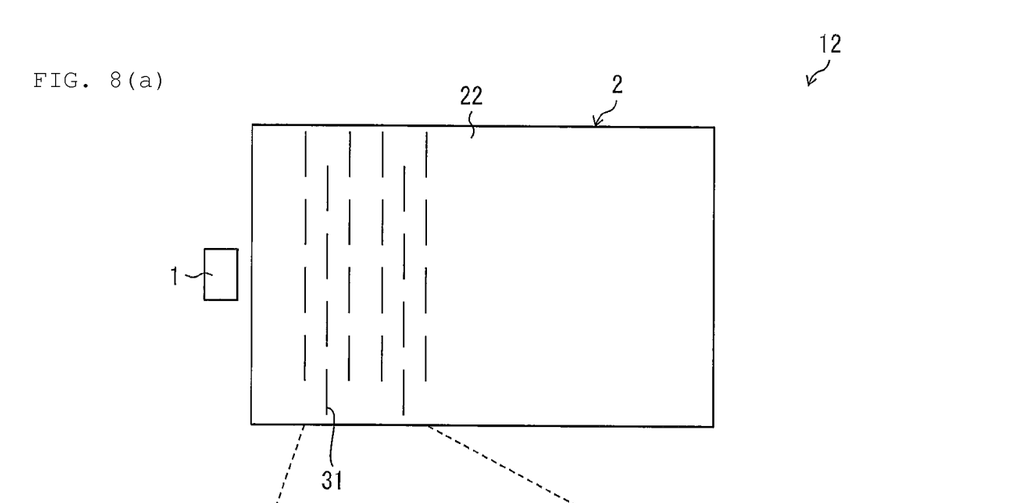
FIG. 8(a) is a top view illustrating another modified example of a light-emitting device.
Figure 8B:
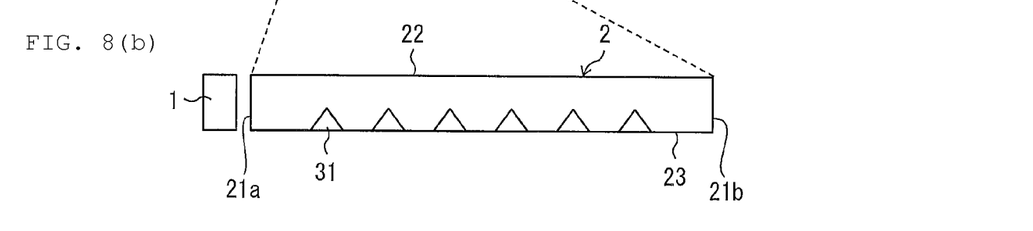
FIG. 8(b) is an enlarged cross-sectional view illustrating a light-emitting device 12 illustrated in FIG. 8(a).

FIG. 8(a) is a top view illustrating another modified example of the light-emitting device, and FIG. 8(b) is an enlarged cross-sectional view illustrating a light-emitting device 12 illustrated in FIG. 8(a).

As in the light-emitting device 12 illustrated in FIGS. 8(a)-8(b), reflection patterns 31 which are fragmented may be provided to the light guide plate 2. Also in this case, one or more embodiments of the present invention, an interval between adjacent reflection patterns 31 in an incident direction of light is approximately 300 μm.

Figure 9:
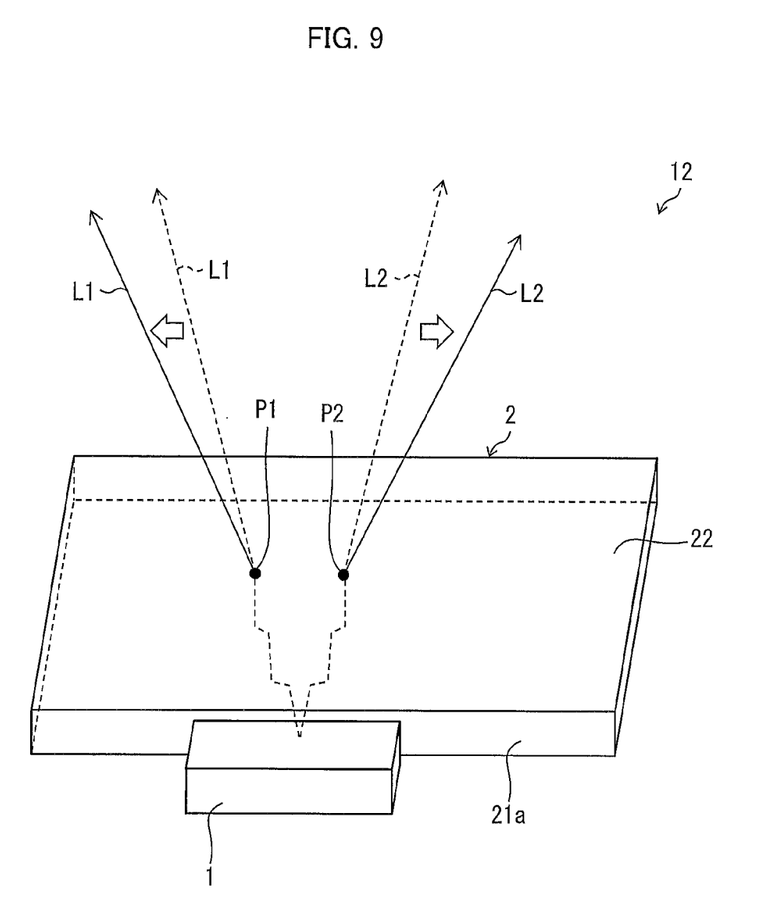
FIG. 9 is a perspective view illustrating the light-emitting device illustrated in FIGS. 8(a)-8(b).
Figure 10A:
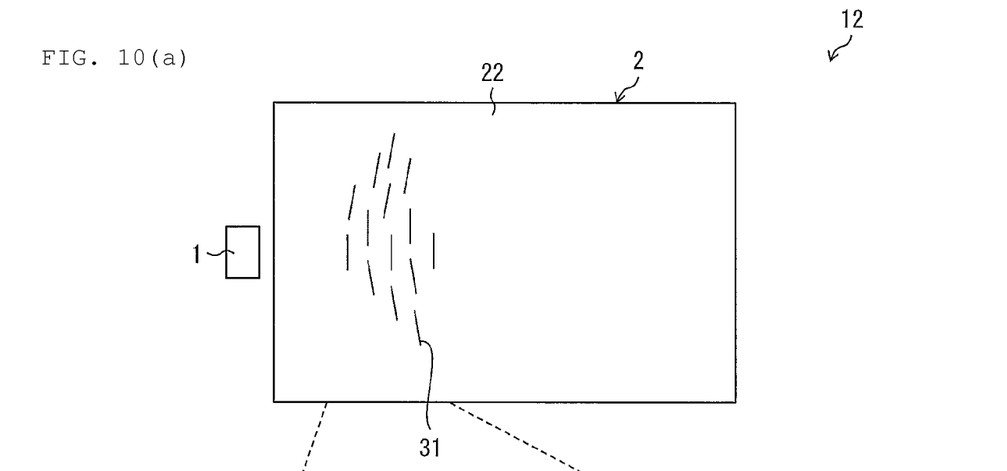
FIG. 10(a) is a top view illustrating the light-emitting device 12 illustrated in FIG. 9.
Figure 10B:
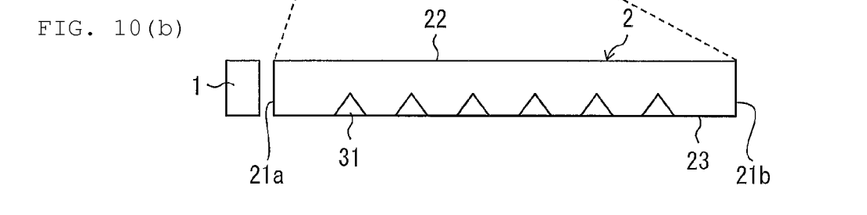
FIG. 10(b) is an enlarged cross-sectional view illustrating the light-emitting device 12 illustrated in FIG. 10(a).

FIG. 9 is a perspective view illustrating the light-emitting device 12. FIG. 10(a) is a top view illustrating the light-emitting device 12 illustrated in FIG. 9, and FIG. 10(b) is an enlarged cross-sectional view illustrating the light-emitting device 12 illustrated in FIG. 10(a).

As illustrated in FIG. 9, for example, in a case where the angle between the straight line that passes through the first position P1 and the center of the one eye E1 and the straight line that passes through the second position P2 and the center of the other eye E2 is increased, the user is given a weaker impression of depth of the displayed object. In this case, the angle can be increased by individually adjusting an angular relation between a corresponding one of the reflection patterns 31 and the light source 1, as illustrated in FIGS. 10(a)-10(b).

As described above, according to the reflection patterns 31 which are fragmented, the angle of reflection by each of the reflection patterns 31 can be easily changed by individually adjusting the positional relation between the each of the reflection patterns 31 and the light source 1.

Figure 11:
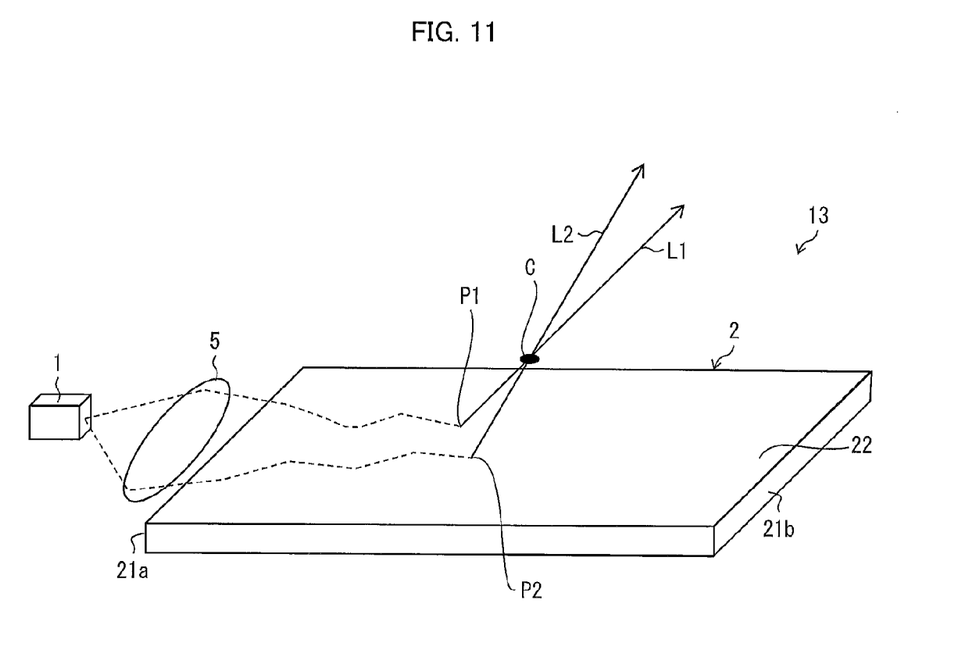
FIG. 11 is a perspective view illustrating an arrangement of a light-emitting device in accordance with one or more embodiments of the present invention.

The following description will discuss, with reference to FIG. 11, one or more embodiments of the present invention. Note that, for easy explanation, the same reference signs will be given to members each having the same function as a member described in one or more of the above-described embodiments, and descriptions on such a member will be omitted.

<Arrangement of Light-Emitting Device 13>

FIG. 11 is a perspective view illustrating an arrangement of a light-emitting device 13 in accordance with one or more embodiments of the present invention. As illustrated in FIG. 11, the light-emitting device 13 includes the light source 1, the light guide plate 2, and a condensing lens (optical member) 5. In one or more embodiments of the present invention, a single light source 1 is provided on the side surface 21a side of the light guide plate 2.

(Condensing Lens 5)

The condensing lens 5 is an optical system which condenses light emitted from the light source 1. The condensing lens 5 is provided between the light source 1 and the light guide plate 2. The condensing lens 5 causes light emitted from the light source 1 to be condensed so as to enter the light guide plate 2 through the side surface 21a. Accordingly, light whose beam diameter gradually decreases along a travelling direction of the light enters the light guide plate 2 through the side surface 21a.

As such, when viewed from a direction perpendicular to the exit surface 22 of the light guide plate 2, the light having entered the light guide plate 2 is guided inside the light guide plate 2 so that a width of the light along the direction perpendicular to the travelling direction of the light gradually decreases. In a case where such light is reflected by, for example, a reflection pattern 3 that has an inclined surface 3a substantially perpendicular to the incident direction of the light, the first emitted light L1 and the second emitted light L2 can be emitted suitably from the exit surface 22 so that the intersection C is located on the observer side with respect to the exit surface 22.

In a case where the intersection C is thus located on the observer side with respect to the exit surface 22, the observer has a view in which the light-emitting point is located in front of the exit surface. This allows the object to be displayed stereoscopically so as to appear popping out.

As described above, the light-emitting device 13 includes the light source 1, the light guide plate 2, and the condensing lens 5 provided between the light source 1 and the light guide plate 2, wherein the condensing lens 5 causes light emitted from the light source 1 to be collected so as to enter the light guide plate 2.

Accordingly, one or more embodiments of the present invention makes it possible to provide the light-emitting device 13 which is suitable for causing an object to be displayed stereoscopically so as to appear popping out.

Note that the amount of the popping out of the object being displayed can be designed by changing the angle of reflection by each of the reflection patterns 3. For example, with respect to a portion of the object which portion is to be displayed with a larger amount of the popping out, the angle of reflection by a corresponding one of the reflection patterns 3 can be changed so that the angle formed at the intersection C by (i) the straight line passing through the first position P1 and the center of the one eye E1 and (ii) the straight line passing through the second position P2 and the center of the other eye E2 increases.

Figure 12A:
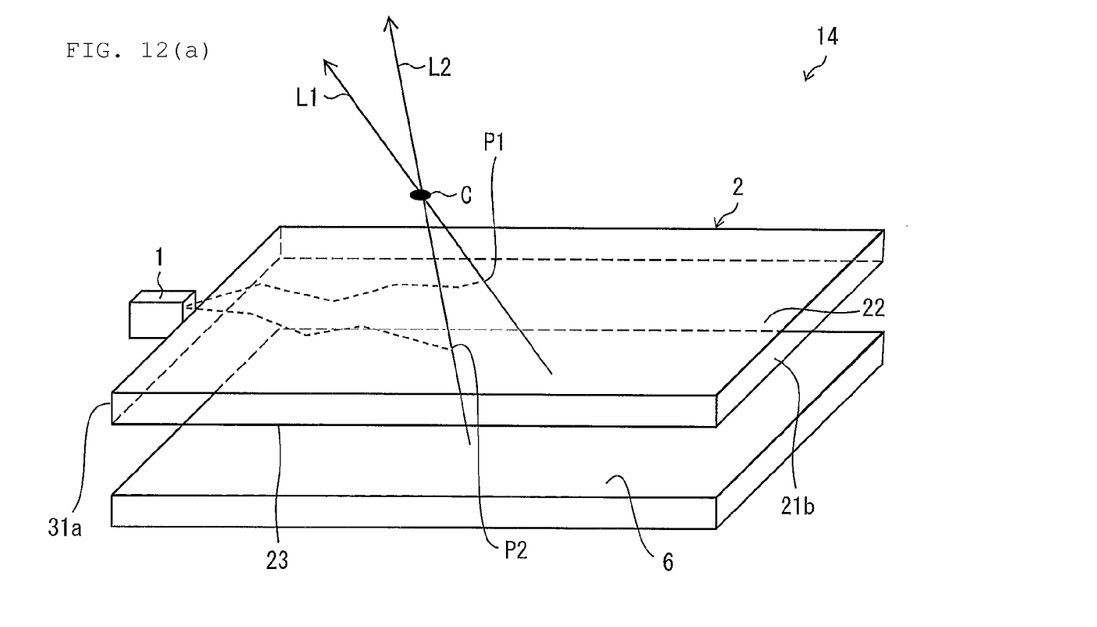
FIG. 12(a) is a perspective view illustrating a light-emitting device in accordance with one or more embodiments of the present invention.
Figure 12B:
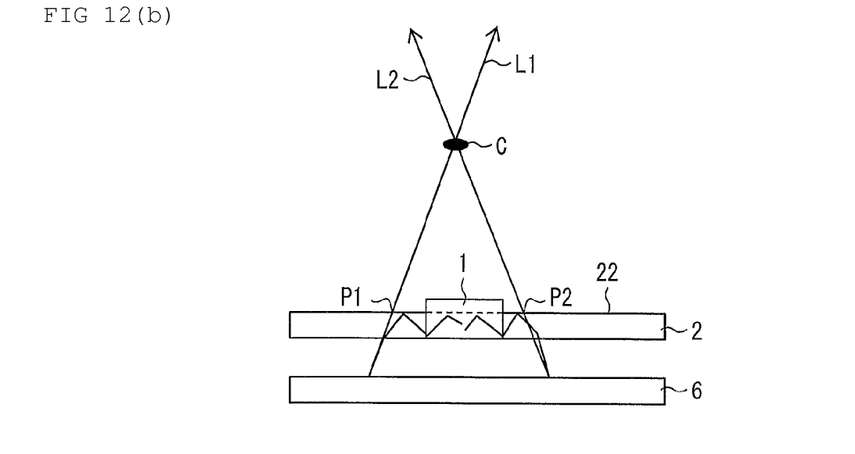
FIG. 12(b) is a cross-sectional view illustrating the light-emitting device illustrated in FIG. 12(a).

The following description will discuss, with reference to FIGS. 12(a)-12(b), one or more embodiments of the present invention. Note that, for easy explanation, the same reference signs will be given to members each having the same function as a member described in any of the above-described embodiments, and descriptions on such a member will be omitted.

<Arrangement of Light-Emitting Device 14>

FIG. 12(a) is a perspective view illustrating a light-emitting device 14 in accordance with one or more embodiments of the present invention, and FIG. 12(b) is a cross-sectional view illustrating the light-emitting device 14 illustrated in FIG. 12(a). As illustrated in FIGS. 12(a)-12(b), the light-emitting device 14 includes the light source 1, the light guide plate 2, and a retroreflective plate (reflecting plate) 6. In one or more embodiments of the present invention, a single light source 1 is provided on the side surface 21a side of the light guide plate 2.

(Retroreflective Plate 6)

The retroreflective plate 6 causes light emitted from the bottom surface 23 of the light guide plate 2 to be reflected by retroreflection toward the exit surface 22. In one or more embodiments of the present invention, in order to first cause light having entered the light guide plate through the side surface 21a to be emitted through the bottom surface 23, the light guide plate 2 includes the reflection patterns 3, for example, on the exit surface 22. The retroreflective plate 6 is provided to face the bottom surface 23 of the light guide plate 2, and the light emitted from the bottom surface 23 is reflected by the retroreflective plate 6 so as to be emitted through the exit surface 22. Note that retroreflection means to cause incident light to be reflected back to where the incident light has entered. By causing the light which the retroreflective plate 6 has reflected by retroreflection to be emitted through the exit surface 22, each of the first emitted light L1 and the second emitted light L2 can be emitted suitably, for example, within an angular range that causes the intersection C to be located on the observer side with respect to the exit surface 22.

As described above, the light-emitting device 14 includes the light source 1, the light guide plate 2, and the retroreflective plate 6 which is provided to face the bottom surface 23 of the light guide plate 2, wherein each of the reflection patterns 3 causes light having entered the light guide plate 2 through the side surface 21a to be reflected toward the bottom surface 23, and the retroreflective plate 6 causes light emitted from the bottom surface 23 to be reflected by retroreflection toward the exit surface 22.

Accordingly, one or more embodiments of the present invention makes it possible to provide the light-emitting device 14 which is suitable for carrying out stereoscopic display and the like of an object so as to cause the object to appear popping out.

Figure 13A:
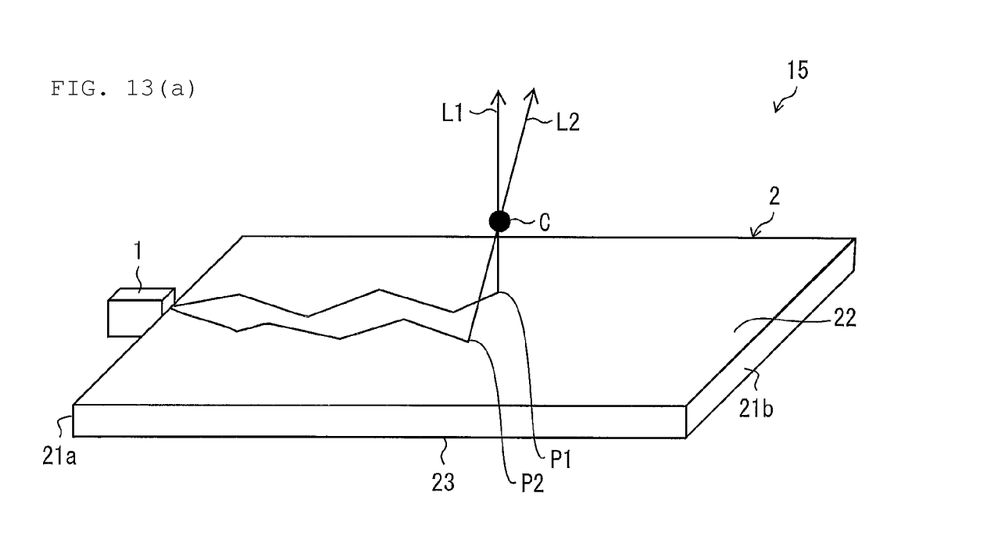
FIG. 13(a) is a perspective view illustrating a light-emitting device in accordance with one or more embodiments of the present invention.
Figure 13B:
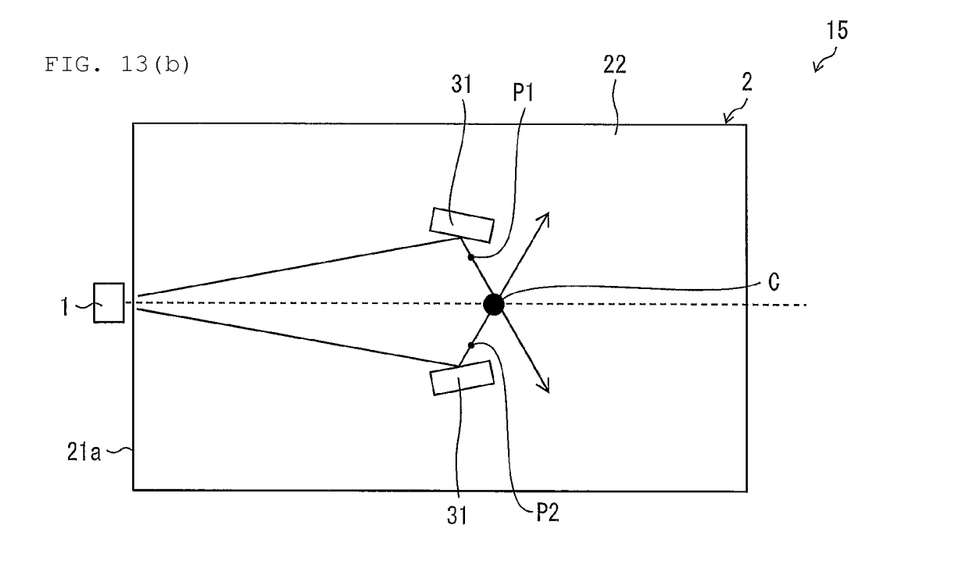
FIG. 13(b) is a top view illustrating an example of a positional arrangement of reflection patterns in the light-emitting device 15 illustrated in FIG. 13(a).

The following description will discuss, with reference to FIGS. 13(a)-13(b), one or more embodiments of the present invention. Note that, for easy explanation, the same reference signs will be given to members each having the same function as a member described in any of the above-described embodiments, and descriptions on such a member will be omitted.

<Arrangement of Light-Emitting Device 15>

FIG. 13(a) is a perspective view illustrating a light-emitting device 15 in accordance with one or more embodiments of the present invention, and FIG. 13(b) is a top view illustrating an example of a positional arrangement of the reflection patterns 31 in the light-emitting device 15 illustrated in FIG. 13(a). In the light-emitting device 15, the angle of reflection by each of the reflection patterns 31 is adjusted to thereby cause an object to be displayed stereoscopically so as to appear popping out.

As illustrated in FIGS. 13(a)-13(b), the light-emitting device 15 includes the light source 1 and the light guide plate 2. In one or more embodiments of the present invention, a single light source 1 is provided on the side surface 21a side of the light guide plate 2.

(Light Guide Plate 2)

In one or more embodiments of the present invention, reflection patterns 31 which are fragmented are provided on the bottom surface 23 of the light guide plate 2. The angle of reflection of each of the reflection patterns 31 is adjusted so that the first emitted light L1 and the second emitted light L2 are emitted respectively from the first position P1 and the second position P2 so that the intersection C is located on the observer side with respect to the exit surface 22. This makes it possible to cause an object to be displayed stereoscopically so as to appear popping out, by using neither the condensing lens 5 nor the retroreflective plate 6.

As described above, the light-emitting device 15 includes the light source 1 and the light guide plate 2, wherein the angle of reflection by each of the reflection patterns 31 provided to the light guide plate 2 is adjusted so that the intersection C is located on the observer side with respect to the exit surface 22. Accordingly, it is not necessary to include the condensing lens 5 and the retroreflective plate 6 in order to cause an object to be displayed stereoscopically so as to appear popping out. This makes it possible to reduce the number of parts of the light-emitting device 15, thereby simplifying the arrangement of the light-emitting device 15.

Accordingly, one or more embodiments of the present invention makes it possible to provide, at low cost, the light-emitting device 15 which is suitable for causing an object to be displayed stereoscopically so as to appear popping out.

The present invention is not limited to the above-described embodiments but allows various modifications within the scope of the claims. Any embodiment derived from an appropriate combination of the technical means disclosed in the different embodiments will also be included in the technical scope of the present invention. Further, a new technical feature can be made by combining technical means disclosed in the respective embodiments.

A light guide body according to one or more embodiments of the present invention includes: reflection patterns each of which causes light emitted from at least one light source and having entered the light guide body through a side surface of the light guide body to be reflected; and an exit surface through which light reflected from each of the reflection patterns is emitted, the exit surface including (i) a first position from which first emitted light is emitted within an angular range that causes the first emitted light to be applied to one eye and a vicinity thereof of an observer observing the exit surface and (ii) a second position from which second emitted light is emitted within an angular range that causes the second emitted light to be applied to the other eye and a vicinity thereof of the observer, a straight line which passes through the first position and a center of the one eye of the observer and a straight line which passes through the second position and a center of the other eye the observer intersecting with each other.

According to the arrangement above, the exit surface is arranged such that the straight line passing through (i) the first position from which the first emitted light is emitted and (ii) the center (pupil, crystalline lens) of the one eye of the observer, and the straight line passing through (i) the second position from which the second emitted light is emitted and (ii) the center of the other eye of the observer intersect with each other. In other words, the optical axis of light viewed by the one eye of the observer among the first emitted light emitted from the first position, and the optical axis of light viewed by the other eye of the observer among the second emitted light emitted from the second position intersect with each other. This causes the observer to feel as if there were a light-emitting point at an intersection where the two straight lines intersect with each other.

Accordingly, by adjusting the number of reflection patterns, the angle of reflection by each reflection pattern, and the like, it is possible to cause the observer to perceive a stereoscopic object constituted by a combination of a plurality of such intersections.

Therefore, the arrangement above makes it possible to provide a light guide body which allows an object such as a diagram or a picture to be displayed stereoscopically.

The light guide body in accordance with one or more embodiments of the present invention can be arranged such that an intersection where the straight line which passes through the first position and the center of the one eye of the observer and the straight line which passes through the second position and the center of the other eye of the observer intersect with each other is located on an observer wide with respect to the exit surface.

In a case where, as in the arrangement above, the intersection is located on the observer side with respect to the exit surface, the observer has a view in which a light-emitting point is located in front of the exit surface.

As such, the arrangement above makes it possible to cause an object to be displayed stereoscopically so as to appear popping out.

The light guide body in accordance with one or more embodiments of the present invention can be arranged such that an intersection where the straight line which passes through the first position and the center of the one eye of the observer and the straight line which passes through the second position and the center of the other eye of the observer intersect with each other is located on a side opposite to an observer side with respect to the exit surface.

In a case where, as in the arrangement above, the intersection is locates on the side opposite to the observer side with respect to the exit surface, the observer has a view in which a light-emitting point is located behind the exit surface.

The arrangement above makes it possible to cause an object to be displayed stereoscopically so as to give the observer an impression of depth.

The light guide body in accordance with one or more embodiments of the present invention can be arranged such that the angular range within which the first emitted light is emitted does not allow the first emitted light to be applied to the other eye of the observer, and the angular range within which the second emitted light is emitted does not allow the second emitted light to be applied to the one eye of the observer.

According to the arrangement above, the first emitted light is viewed only by the one eye of the observer, and the second emitted light is viewed only by the other eye of the observer.

Accordingly, the arrangement above makes it possible to carry out desirable stereoscopic display in which interference from the first emitted light and the second emitted light is suppressed.

A light-emitting device in accordance with one or more embodiments of the present invention includes the light guide body and the at least one light source.

The arrangement above makes it possible to provide a light-emitting device which is capable of causing an object such as a diagram or a picture to be stereoscopically displayed by means of the light guide body.

The light-emitting device in accordance with one or more embodiments of the present invention can be arranged such that the at least one light source is a plurality of light sources arranged along the side surface, and a directivity of light emitted from each of the plurality of light sources is controlled so that light emitted from one of the plurality of light sources is transmitted through the first position and the second position.

According to the above arrangement, the directivity of light emitted from each of the plurality of light sources is controlled so that light emitted from one of the plurality of light sources is transmitted through the first position and the second position. This allows first emitted light and second emitted light both corresponding to a specific light source to be emitted from the first position and the second position.

Accordingly, the arrangement above makes it possible to carry out desirable stereoscopic display in which interference from light emitted from other light sources is suppressed.

The light-emitting device in accordance with one or more embodiments of the present invention can be arranged such that the light-emitting device further includes an optical member provided between the at least one light source and the light guide body, the optical member causing light emitted from the at least one light source to be condensed so as to enter the light guide body.

According to the arrangement above, the light condensed by the optical member enters the light guide body. In a case where such light is reflected by a reflection pattern, the first emitted light and the second emitted light can be emitted suitably through the exit surface within an angular range that causes the intersection to be located on the observer side with respect to the exit surface.

Therefore, the arrangement above makes it possible to carry out suitable stereoscopic display and the like of an object so as to cause the object to appear popping out.

The light-emitting device in accordance with one or more embodiments of the present invention can be arranged such that the light-emitting device further includes a reflecting plate provided on a counter surface side of the light guide body, the counter surface side being opposite to an exit surface side of the light guide body, each of the reflection patterns causing light which has entered the light guide body through the side surface to be reflected toward the counter surface, the reflecting plate causing light emitted from the counter surface to be reflected by retroreflection toward the exit surface.

According to the arrangement above, the light reflected which the reflecting plate has reflected by retroreflection is emitted through the exit surface. Note, here, that retroreflection means to cause incident light to be reflected back to where the incident light has entered. By causing the light which the retroreflective plate has reflected by retroreflection to be emitted through the exit surface, each of the first emitted light and the second emitted light can be emitted suitably, for example, within an angular range that causes the intersection to be located on the observer side with respect to the exit surface 22.

Therefore, the arrangement above makes it possible to carry out stereoscopic display and the like of an object so as to cause the object to appear popping out.

One or more embodiments of the present invention is applicable to a light guide body in which light incident to the light guide body from a light source is guided and emitted from a light exit surface, and a light-emitting device including the light guide body. One or more embodiments of the present invention can be suitably mounted, for example, in a pachinko machine, a slot machine, or the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1: LIGHT SOURCE
2: LIGHT GUIDE PLATE (LIGHT GUIDE BODY)
3: REFLECTION PATTERN
3A: INCLINED SURFACE (REFLECTING SURFACE)
4: LIGHT-EMITTING AREA
5: CONDENSING LENS (OPTICAL MEMBER)
6: RETROREFLECTIVE PLATE (REFLECTING PLATE)
10: LIGHT-EMITTING DEVICE
11: LIGHT-EMITTING DEVICE
12: LIGHT-EMITTING DEVICE
13: LIGHT-EMITTING DEVICE
14: LIGHT-EMITTING DEVICE
15: LIGHT-EMITTING DEVICE
21A: SIDE SURFACE
21B: SIDE SURFACE
22: EXIT SURFACE
23: BOTTOM SURFACE (COUNTER SURFACE)
31: REFLECTION PATTERN
C: INTERSECTION
E1: EYE (ONE EYE)
E2: EYE (THE OTHER EYE)
L: EMITTED LIGHT (LIGHT)
L1: FIRST EMITTED LIGHT
L2: SECOND EMITTED LIGHT
P1: FIRST POSITION
P2: SECOND POSITION

The invention claimed is:

1. A light guide body comprising:
a plurality of reflection patterns, each of which reflects light emitted from at least one light source and enters the light guide body through a side surface of the light guide body; and
an exit surface through which light reflected from each of the plurality of reflection patterns is emitted,
wherein the exit surface comprises:
a first position from which first emitted light is emitted within an angular range that causes the first emitted light to be applied to one eye and a vicinity thereof of an observer observing the exit surface; and
a second position from Which second emitted light is emitted within an angular range that causes the second emitted light to be applied to the other eye and a vicinity thereof of the observer,
wherein one of the plurality of reflection patterns emits the first emitted light and another one of the plurality of reflection patterns emits the second emitted light,
wherein a straight line which passes through the first position and a center of the one eye of the observer and a straight line Which passes through the second position and a center of the other eye of the observer intersect with each other at an intersection so that a real image point is displayed at the intersection, and
wherein an object corresponding to an arrangement of the plurality of reflection patterns is stereoscopically displayed before or behind the exit surface in such a manner that, in order to display a plurality of the real image points which are arranged together, the plurality of reflection patterns are arranged so as to provide a plurality of the intersections, so that a group of the plurality of real image points are formed.

2. The light guide body as set forth in claim 1, wherein an intersection where the straight line which passes through the first position and the center of the one eye of the observer and the straight line which passes through the second position and the center of the other eye of the observer intersect with each other is located on an observer wide with respect to the exit surface.

3. The light guide body as set forth in claim 1, wherein an intersection where the straight line which passes through the first position and the center of the one eye of the observer and the straight line which passes through the second position and the center of the other eye of the observer intersect with each other is located on a side opposite to an observer side with respect to the exit surface.

4. The light guide body as set forth in claim 1,
wherein the angular range within which the first emitted light is emitted does not allow the first emitted light to be applied to the other eye of the observer; and
wherein the angular range within which the second emitted light is emitted does not allow the second emitted light to be applied to the one eye of the observer.

5. A light-emitting device comprising: a light guide body recited in claim 1; and the at least one light source.

6. The light-emitting device as set forth in claim 5,
wherein the at least one light source is a plurality of light sources arranged along the side surface; and
wherein a directivity of light emitted from each of the plurality of light sources is controlled so that light emitted from one of the plurality of light sources is transmitted through the first position and the second position.

7. A light-emitting device as set forth in claim 5, further comprising:
an optical member provided between the at least one light source and the light guide body,
wherein the optical member causes light emitted from the at least one light source to be condensed so as to enter the light guide body.

8. A light-emitting device as set forth in claim 5, further comprising:

a reflecting plate provided on a counter surface side of the light guide body, the counter surface side being opposite to an exit surface side of the light guide body, wherein each of the reflection patterns causes light which has entered the light guide body through the side surface to be reflected toward the counter surface, and wherein the reflecting plate causing light emitted from the counter surface to be reflected by retroreflection toward the exit surface.

* * * * *